United States Patent
Hipps, Sr. et al.

(10) Patent No.: US 10,087,326 B2
(45) Date of Patent: Oct. 2, 2018

(54) AQUEOUS-BASED HYDROLYTICALLY STABLE DISPERSION OF A BIODEGRADABLE POLYMER

(71) Applicant: Michelman, Inc., Cincinnati, OH (US)

(72) Inventors: Jesse Hipps, Sr., Loveland, OH (US); Hong Cai, West Chester, OH (US); Edward R. Gay, Cincinnati, OH (US); Talia McKinney Collins, Lebanon, OH (US); John Bernard Homoelle, Cincinnati, OH (US)

(73) Assignee: Michelman, Inc., Cincinnati, OH (US)

( * ) Notice: Subject to any disclaimer, the term of this patent is extended or adjusted under 35 U.S.C. 154(b) by 0 days.

(21) Appl. No.: 15/444,699

(22) Filed: Feb. 28, 2017

(65) Prior Publication Data

US 2017/0247537 A1    Aug. 31, 2017

Related U.S. Application Data

(60) Provisional application No. 62/301,017, filed on Feb. 29, 2016.

(51) Int. Cl.
| | | |
|---|---|---|
| *C08J 3/05* | (2006.01) | |
| *C08L 67/04* | (2006.01) | |
| *C09D 167/00* | (2006.01) | |
| *C09D 167/04* | (2006.01) | |

(52) U.S. Cl.
CPC ............... *C08L 67/04* (2013.01); *C08J 3/05* (2013.01); *C09D 167/00* (2013.01); *C09D 167/04* (2013.01); *C08J 2367/00* (2013.01); *C08J 2367/04* (2013.01); *C08L 2201/06* (2013.01); *C08L 2201/54* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,177,177 A | 12/1979 | Vanderhoff et al. | |
| 4,968,350 A | 11/1990 | Vindschaedler et al. | |
| 5,049,322 A | 9/1991 | Devissaguet et al. | |
| 5,869,567 A | 2/1999 | Fujita et al. | |
| 5,891,936 A | 4/1999 | Liddell et al. | |
| 5,952,460 A | 9/1999 | Liddell et al. | |
| 5,993,530 A | 11/1999 | Tanaka et al. | |
| 6,103,858 A | 8/2000 | Yamamoto et al. | |
| 6,306,934 B1 | 10/2001 | Bode et al. | |
| 6,413,292 B1 | 7/2002 | Locquengh et al. | |
| 6,716,911 B2 | 4/2004 | Doi et al. | |
| 6,831,126 B2 | 12/2004 | Gertzmann et al. | |
| 7,135,522 B2 | 11/2006 | Gloeckner et al. | |
| 7,205,352 B2 | 4/2007 | Weipert et al. | |
| 7,271,211 B2 | 9/2007 | Weipert et al. | |
| 7,314,900 B2 | 1/2008 | Tazzia et al. | |
| 7,491,754 B2 | 2/2009 | Send et al. | |
| 7,605,194 B2 | 10/2009 | Ferencz et al. | |
| 7,763,676 B2 | 7/2010 | Moncla et al. | |
| 7,973,099 B2 | 7/2011 | Rajaraman | |
| 8,022,138 B2 | 9/2011 | Argyropoulos et al. | |
| 8,158,711 B2 | 4/2012 | Moncla et al. | |
| 8,168,699 B2 | 5/2012 | Lincoln et al. | |
| 8,273,514 B2 | 9/2012 | Tong et al. | |
| 8,349,929 B2 | 1/2013 | Kainz et al. | |
| 8,679,826 B2 | 3/2014 | Yamamoto et al. | |
| 8,741,986 B2 | 6/2014 | Wade et al. | |
| 8,846,786 B2 | 9/2014 | De Waele et al. | |
| 9,085,688 B2 | 7/2015 | Whitehouse | |
| 9,624,339 B2 | 4/2017 | Herve et al. | |
| 9,670,311 B2 | 6/2017 | Tanaka et al. | |
| 2007/0088099 A1 | 4/2007 | Mentink et al. | |
| 2008/0200605 A1 | 8/2008 | Wildeson et al. | |
| 2010/0015236 A1 | 1/2010 | Magdassi et al. | |
| 2010/0257657 A1 | 10/2010 | Hamann et al. | |
| 2011/0237710 A1* | 9/2011 | Serpelloni | C08J 3/05 523/351 |
| 2013/0177846 A1 | 7/2013 | Watanabe et al. | |
| 2015/0005174 A1 | 1/2015 | Tanaka et al. | |
| 2015/0208743 A1 | 7/2015 | Hamann et al. | |
| 2016/0053050 A1 | 2/2016 | Tabor et al. | |
| 2016/0264851 A1 | 9/2016 | Maekawa et al. | |
| 2017/0015806 A1 | 1/2017 | Yoshikawa et al. | |
| 2017/0321017 A1 | 11/2017 | Sugihara et al. | |
| 2017/0327637 A1* | 11/2017 | Niizeki | C08G 63/78 |
| 2017/0367964 A1 | 12/2017 | Yamamoto et al. | |

FOREIGN PATENT DOCUMENTS

| | | | |
|---|---|---|---|
| CA | 2849663 A1 | 3/2013 | |
| CN | 101993585 | * 3/2011 | |
| EP | 0274961 A1 | 7/1988 | |
| EP | 0776371 A1 | 6/1997 | |
| EP | 0809669 A1 | 12/1997 | |
| EP | 2770004 A1 | 8/2014 | |
| JP | 2004002871 A | 1/2004 | |
| JP | 2004018744 A | 1/2004 | |
| JP | 2004035811 A | 2/2004 | |
| JP | 2004099883 A | 4/2004 | |
| JP | 2004107413 A | 4/2004 | |
| JP | 2004168927 A | 6/2004 | |
| JP | 2004244570 A | 9/2004 | |
| JP | 2004323804 A | 11/2004 | |
| JP | 4577804 B2 | 11/2010 | |
| WO | 9933558 A1 | 7/1999 | |
| WO | 2011024023 A1 | 3/2011 | |
| WO | 2012149407 A1 | 11/2012 | |
| WO | 2014023319 A1 | 2/2014 | |
| WO | 2014024939 A1 | 2/2014 | |
| WO | 2014157507 A1 | 10/2014 | |
| WO | WO-2016080530 A1 * | 5/2016 | |

OTHER PUBLICATIONS

Computer Translation of CN 101993585 (2011) (Year: 2011).*

(Continued)

*Primary Examiner* — Robert C Boyle

(74) *Attorney, Agent, or Firm* — Dinsmore & Shohl LLP

(57) ABSTRACT

Embodiments of an aqueous-based dispersion of a hydrolytically unstable polymer comprise particles of said hydrolytically unstable polymer and a stabilizing agent in water. The dispersion is substantially free of volatile organic solvents.

15 Claims, No Drawings

(56) References Cited

OTHER PUBLICATIONS

Sah, Macromolecular Rapid Communications, 2006, 27, p. 1845-1851 (Year: 2006).*
Rathi, Sahas R., et al., Maintaining Structural Stability of Poly(Lactic Acid): Effects of Multifunctional Epoxy Based Reactive Oligomers, Polymers, (2014), pp. 1232-1250.
International Search Report issued in International Patent Application No. PCT/US2014/019914 filed Feb. 28, 2017, 6 pages.
Written Opinion issued in International Patent Application No. PCT/US2014/019914 filed Feb. 28, 2017, 8 pages.

* cited by examiner

AQUEOUS-BASED HYDROLYTICALLY STABLE DISPERSION OF A BIODEGRADABLE POLYMER

CROSS-REFERENCE TO RELATED APPLICATIONS

This application claims priority to U.S. Provisional Patent Application Ser. No. 62/301,017 filed Feb. 29, 2016 and entitled "Aqueous-Based Hydrolytically Stable Dispersion of a Biodegradable Polymer and Method of Making Such a Dispersion," the entirety of which is incorporated by reference herein.

TECHNICAL FIELD

Embodiments relate to aqueous-based dispersions of at least one hydrolytically unstable polymer, and more particularly to aqueous-based dispersions of at least one hydrolytically unstable polymer which are substantially free from organic solvents.

BACKGROUND

Aqueous-based polymer dispersions find use in a wide variety of fields such as adhesives, binders, sizing agents, sealants, primers, inks, paints, seed or grain coating systems, and paper coatings. Such dispersions also find use in pharmaceutical industries for drug delivery, in medical testing kits, or as additives in cosmetics. A major use of such dispersions has been to form thin barrier coatings on paper, paperboard packaging, various plastic films, and containers. However, the synthetic polymers typically used to form such dispersions and coatings are typically sourced from petroleum. This can sometimes make the polymers difficult to recycle and problematic in landfills where biodegradability is required.

To address these problems, the art has turned to biodegradable polymers such as, for example, polylactic acid (PLA), polyhydroxyalkanoate (PHA), polyhydroxybutyrate (PHB), polyhydroxyvalerate (PHV), polyhydroxyhexanoate (PHH), copolymers of glycolic and lactic acid (PLGA), and polycaprolactones. Initial efforts at making coatings of such biodegradable polymers involved melting such polymers and then extruding them into thin films. However, this required working the polymers at high temperatures which could cause premature degradation of the polymers and employed extrusion and drawing techniques that were equipment and energy intensive.

Later efforts involved dissolving the biodegradable polymers in volatile organic solvents, coating the dissolved materials onto substrates, and then removing the solvents. These later efforts generated a different set of problems in the handling and disposal of such volatile compounds. These problems included toxicity, flammability, and environmental pollution. In addition, such films can also leave some residual solvent in the coating which can adversely affect organoleptic properties.

More recently, efforts have been made to provide processes of making aqueous dispersions of biodegradable polymers which do not use volatile organic solvents. Doi et al., U.S. Pat. No. 6,716,911, teach making an aqueous biodegradable polymer dispersion by melt kneading the polyester and an aqueous emulsifier solution in an extruder. However, the pH of the dispersion must be controlled within relatively narrow limits to avoid hydrolysis of the polyester. Tanaka et al., U.S. Pat. No. 2015/0005174, teach a novel polylactic polyester resin that is said to exhibit superior water dispersibility so that it can be formulated into an aqueous dispersion without the need for emulsifiers or organic solvents. However, the dispersion is specific to a narrow class of defined polymer structures. Whitehouse, U.S. Pat. No. 9,085,688, teaches a process for producing aqueous dispersions of hydroxyalkanoate polymers or copolymers using a heated twin screw extruder. Water and surfactants are added to the hot polymer melt to form the dispersion. Again, however, the dispersion is limited to a narrow class of a specific polymer.

Accordingly, there remains a need in this art for processes which are effective to provide for broader-based aqueous dispersions which are both substantially free from organic solvents and hydrolytically stable over a wide pH range.

SUMMARY

In accordance with one embodiment, a hydrolytically stable, aqueous-based dispersion of a hydrolytically unstable polymer is provided. The dispersion includes particles of the hydrolytically unstable polymer and a stabilizing agent dispersed in water. The dispersion is stable over a broad pH range, can include a range of particle sizes, and is substantially free of volatile organic solvents. Typically, the dispersion will have a viscosity of from about 10 to about 1000 mPa·s and will have a total solids content of from about 10 to about 60% by weight. Although various embodiments may include a total solids content of from about 60 wt % to about 90 wt %, it is contemplated that the total amount of solids may be decreased by diluting the dispersion.

In various embodiments, the hydrolytically unstable polymer may be a biodegradable polymer. By "biodegradable polymer," we mean a specific type of polymer that breaks down after fulfilling its intended purpose resulting in natural byproducts such as gases ($CO_2$, $N_2$), water, biomass, and inorganic salts. Included within the scope of the term are copolymers and blends of biodegradable polymers.

By "substantially free of" we mean that the dispersion contains less than about 0.2 wt % of any volatile organic solvents. By "volatile organic solvents," we mean organic compounds having vapor pressures at ambient temperatures such that at least a portion of the compound evaporates or sublimates and enters the surrounding atmosphere and is measurable by USEPA Test Method 24. By "hydrolytically stable," we mean that the dispersion of the biopolymer in water substantially retains its structure, molecular weight, colloidal stability, and/or content without degrading into its monomeric or other decomposition materials and does so over a usable period of time, typically for at least 8 hours, or from one week to up to six months when stored at ambient and temperatures up to 50° C. Conversely, what is meant by "hydrolytically unstable" is that a material (e.g., a polymer) or dispersion fails to meet the standard provided above for "hydrolytically stable."

In some embodiments, the hydrolytically stable dispersion further includes a rheology modifier. A rheology modifier is a compound or compounds that act to change the viscosity of the dispersion, typically by increasing the viscosity.

Accordingly, it is a feature of various embodiments to provide aqueous-based dispersions of hydrolytically unstable polymers, and methods of making such dispersions, which are substantially free from organic solvents and which are hydrolytically stable. Other features and advantages of various embodiments will be apparent from the following detailed description and the appended claims.

DETAILED DESCRIPTION

Various embodiments provide an aqueous-based dispersion of a hydrolytically unstable polymer which is substantially free of volatile organic compounds. The dispersion comprises particles of the hydrolytically unstable polymer and a stabilizing agent in water. The dispersion is stable over a broad pH range of from about 3.0 to about 11.5 and can include a range of particle sizes. For example, the particles of biodegradable polymer in the dispersion may have a diameter ranging from about 2.5 nm to about 600 µm. For the purposes of clarifying, one characteristic of stability would be a loss in solids of no more than 10 wt % when the dispersion is kept for a week or more at ambient conditions (about 23° C.).

In general, the aqueous-based dispersions described herein include particles which are dispersed in a continuous aqueous phase. In some embodiments, the dispersed particles may be referred to as the "discontinuous phase." As used herein, the term "dispersion" includes suspensions, colloids, and emulsions. In other words, the discontinuous phase may include solid particles, liquids, oils, or the like.

In one embodiment, the dispersion comprises from about 0.5 wt % to about 95 wt %, from about 50 wt % to about 90 wt %, from about 20 wt % to about 75 wt %, from about 20 wt % to about 60 wt %, from about 21 wt % to about 50 wt %, or from about 35 wt % to about 47 wt % hydrolytically unstable polymer based on a total weight of the aqueous dispersion. The dispersion may further include from about 0.1 wt % to about 25 wt %, from about 0.5 wt % to about 15 wt %, or from about 1 wt % to about 8 wt % stabilizing agent based on a total weight of the aqueous dispersion. The dispersion may further include from about 0.01 wt % to about 5.0 wt %, from about 0.1 wt % to about 3 wt %, or from about 1 wt % to about 3 wt % rheology modifier based on a total weight of the aqueous dispersion. The balance of the weight of the aqueous dispersion may be water. In other embodiments, the dispersion may further include a pH buffering agent containing from about 0.01 wt % to about 1 wt % or from about 0.1 wt % to about 0.5 wt % of a weak acid and weak base salt pair, where the weight percentages are based on total concentration of salt in the aqueous-based dispersion delivered by the buffer. While various ranges of amounts of the components in the dispersion have been disclosed, it is contemplated that other amounts and ranges may be obtained by concentrating or diluting the dispersion depending on the particular application.

In various embodiments, the hydrolytically unstable polymer is a biodegradable polymer. The biodegradable polymer may comprise any of the known classes of biodegradable polymers, and may be, for example, a polyurethane, a polystyrene, a polyamide, a polyester polymer (e.g., aliphatic polyester and/or aromatic polyester), lignin based plastics, starch-based plastics, cellulose-based plastics, protein-based plastics, bio-derived polyethylene. For example, the biodegradable polymer may be selected from the group consisting of polylactic acid (PLA), polymalate (PMA), polyhydroxyalkanoate (PHA), polyhydroxybutyrate (PHB), polycaprolactone (PCL), polyesteramide (PEA), polyhydroxyvalerate (PHV), polyhydroxyhexanoate (PHH), aliphatic copolyesters (PBSA), polyethylene furanoate (PEF), polybutylene succinate (PBS), polyglycolic acid, aliphatic polyaspartic, polyurea, soybase polymers, poly(poly sebate) polyacrylic acid and mixtures and co-polymers thereof, including but not limited to polylactic-glycolic-acid copolymers. In some embodiments, the biodegradable polymer is a polyester polymer, such as, by way of example and not limitation, PLA, PMA, PHB PHA, PCL, PEA, PHV, PHH, PBSA, PEF, PPS, polyglycolic acid, or PBS. In a specific example, the biodegradable polymer is PLA. The hydrolytically unstable polymer may be in crystalline, semi-crystalline, or amorphous form.

Without wishing to be bound by theory, the stabilizing agent of the dispersion is believed to act to at least partially encapsulate particles of the hydrolytically unstable polymers to reduce hydrolysis and to enhance the stability of such particles in the dispersion to prevent particles from agglomerating and settling or floating out of the dispersion. In some instances, the stabilizing agent may act to form a coating on the surface of the hydrolytically unstable polymer particles. In some instances, the stabilizing agent may be referred to as a "colloidal stabilizing agent."

In one embodiment, the stabilizing agent is selected from the group consisting of polyvinyl alcohol, polyethylene glycols, cellulosic polysaccharides, including carboxymethyl cellulose, carboxymethyl hydroxyethyl cellulose, ethyl hydroxyethyl cellulose, hydroxyethyl cellulose, hydroxypropyl methyl cellulose, and methyl cellulose; biopolymer polysaccharides including gellan gum, rhamsan gum, whelan gum, xanthan gum, guar gum, hydroxypropyl guar gum, and sodium alginate; synthetic hydrocarbon polymers including polyacrylamide and copolymers thereof, polyethylene oxide, polyhydroxyethyl (meth)acrylate, poly(meth) acrylic acid and copolymers thereof, polyolefinic sulfonate copolymers, polyvinylpyrrolidone, copolymers of polystyrene and maleic anhydride, copolymers of polymethylene ether and maleic anhydride; and saponified fatty acids including stearic, palmitic, oleic, linoleic, lauric, behenic, erucic, lignoceric, nervonic, brassidic, gadoleic, vaccenic, caproleic, lauroleic, myristoleic, elaidic, palmitoleic, icosanoic, myristic, octanoic, hexanoic, butanoic, and blends thereof. In some embodiments, the stabilizing agent may include one or more acrylic copolymers, polyacrylate ammonium salts, polyether carboxylate polymers, non-associative thickeners and associative thickeners, and base-neutralized ethylene acrylic acid copolymers. In one particular embodiment, the stabilizing agent may include ethylene acrylic acid copolymer (EAA).

In various embodiments, the stabilizing agent may additionally function as a rheology modifier for the dispersion. For example, the dispersion may include a gum, a cellulosic, a sodium alginate, PVOH, EAA, or the like, which may act as both a stabilizing agent and a rheology modifier for the aqueous dispersion. However, in other embodiments, a first component may be included in the dispersion as a stabilizing agent and a second, different, component may be included in the dispersion as a rheology modifier.

Without wishing to be bound by theory, the rheology modifier of the dispersion is believed to act to at least partially encapsulate particles of the hydrolytically unstable polymers to reduce hydrolysis and to enhance the stability of such particles in the dispersion. In some instances, the rheology modifier may act to form a coating on the surface of the stabilizing agent and/or the hydrolytically unstable polymer particles. It is believed that the rheology modifier also acts to prevent the hydrolytically unstable polymer particles from separating out of the dispersion by increasing the viscosity of the continuous phase of the dispersion.

In one embodiment, the rheology modifier is selected from the group consisting of inorganic clays including bentonite, calcium carbonate, and fumed silica; cellulosic polysaccharides including carboxymethyl cellulose, carboxymethyl hydroxyethyl cellulose, ethyl hydroxyethyl cellulose, hydroxyethyl cellulose, hydroxypropyl methyl cellulose, methyl cellulose, and nanocrystalline cellulose; synthetic hydrocarbon polymers including polyacrylamide and copolymers thereof, polyethylene oxide, polyhydroxyethyl (meth)acrylate, poly(meth)acrylic acid and copolymers thereof, polyolefinic sulfonate and copolymers thereof, polyvinylpyrrolidone, copolymers of polystyrene and maleic anhydride, copolymers of polymethylene ether and maleic anhydride; biopolymer polysaccharides including gellan gum, rhamsan gum, whelan gum, xanthan gum, guar gum, hydroxypropyl guar gum, and sodium alginate. In some embodiments, the rheology modifier may include one or more acrylic copolymers, polyacrylate ammonium salts, polyether carboxylate polymers, non-associative thickeners and associative thickeners, and base-neutralized ethylene acrylic acid copolymers.

In some embodiments, the dispersion further includes a pH buffering agent. The optional pH buffering agent is useful to sequester any residual acid monomers present in the hydrolytically unstable polymer composition. It is also be useful to aid in maintaining pH stability near a neutral pH of 7.0, thereby minimizing any hydrolytic instability as previously defined. Without wishing to be bound by theory, the optional pH buffering agent may also act to create a salt effect, causing the water soluble stabilizing agent and/or rheology modifier to precipitate onto the surface of the hydrolytically unstable polymer particles, providing additional protection from hydrolysis of the hydrolytically unstable polymer particles. In one embodiment, the pH buffering agent is selected from the group consisting of salts of weak acids or bases or other known buffering agents having $pK_a$ values of between 6 and 8. The salts may be organic salts, inorganic salts, or combinations thereof.

One exemplary embodiment of a dispersion includes particles of polylactic acid as the hydrolytically unstable polymer, polyvinyl alcohol as the stabilizing agent, and xanthan gum as the rheology modifier.

Embodiments also provide processes for making the stable, aqueous-based dispersion. In one embodiment, the process includes emulsifying the hydrolytically unstable polymer at a temperature of from between about 25° C. to about 170° C. by blending together the hydrolytically unstable polymer, water, and a stabilizing agent to form a hydrolytically stable aqueous based dispersion of particles of the hydrolytically unstable polymer. In some embodiments, the process may be carried out under pressure, although it is contemplated that the process may be carried out at atmospheric pressure depending on the particular embodiment. The hydrolytically unstable polymer may be heated to a temperature above its melting point before blending with water to form an aqueous dispersion. An aqueous solution of the stabilizing agent is then blended into the dispersion.

Alternatively, the hydrolytically unstable polymer may be provided as a micronized powder, and the process carried out at a temperature below the melting point of the hydrolytically unstable polymer. The micronized powder may have an average particle size of less than about 600 µm, less than about 100 µm, less than about 50 µm, less than about 25 µm, less than about 10 µm, or even less than about 50 nm. In some embodiments, the micronized powder includes particles with a diameter of less than 100 µm and an average particle size of less than about 5µm. For example, the micronized powder may include particles having an average diameter ranging from about 25 nm to about 600 µm, from about 50 nm to about 500 µm, from about 100 nm to about 400 µm, or the like.

Any suitable mixing apparatus may be utilized. For example, if the polymer is to be heated to above its melting point, a reactor or extruder may be used to combine the components of the dispersion. Alternatively, other mixing devices and processes may be used including, for example, wet milling devices, a rotor stator, high pressure homogenization reactor using a cavitation mixer, a solid shear state pulverization device, a high pressure mixing reactor, a cone high pressure reactor, a flash nanoprecipitation vessel, a supercritical fluid precipitation system (e.g., supercritical $CO_2$ precipitation), or an ultrasonic mixing vessel.

In one embodiment in which a rheology modifier is included in the dispersion, the hydrolytically unstable polymer, water, and stabilizing agent are blended together to form a dispersion, and an aqueous solution containing a rheology modifier is then blended into the dispersion. This may be accomplished in a reactor or a heated extruder, although other methods are contemplated. In one embodiment, a dispersion of the polymer melt, water, and stabilizing agent is formed, and the dispersion is allowed to cool. An aqueous solution of a rheology modifier is blended into the cool dispersion. An optional pH buffering agent may also be added to the dispersion to stabilize it.

In some embodiments, the process is carried out and the mixing devices are operated to provide particles of the hydrolytically unstable polymer having a diameter in the range of from about 2.5 nm to about 600 µm.

In another embodiment, the process for making an aqueous-based hydrolytically stable dispersion in which the hydrolytically unstable polymer is polylactic acid comprises emulsifying the polylactic acid, water, polyvinyl alcohol, and xanthan gum (for example, Keltrol® from CP Keltrol) in a reactor or heated extruder at a temperature of from about 25° C. to about 170° C. under pressure for a time sufficient (from about 5 seconds to about 1 minute) to form an aqueous-based dispersion of particles of polylactic acid. The process can be carried out by first blending together the polylactic acid polymer with a first portion of water and polyvinyl alcohol to form a first mixture. The first mixture is then blended with a second portion of water and xanthan gum to form the dispersion.

The present embodiments of the aqueous-based polymer dispersions are contemplated to have applicability in a wide variety of applications, fields, and uses, such as adhesives, binders, sizing agents, composites, fibers, sealants, primers, inks, overprint varnish, lubrication, paints, seed or grain coating systems, agricultural coatings, textile coatings, floor care coatings, glass coatings, personal care products, and paper coatings. Such dispersions also find use in pharmaceutical industries for drug delivery, the oil and gas industry for drilling formulations, in medical testing kits, or as additives in cosmetics. A major use of such dispersions has been to form thin barrier coatings on paper, paperboard packaging, various plastic films, and containers.

Additionally, these aqueous dispersions may be converted back to micropowders for various contemplated applications. For example, these converted micropowders may be utilized in redispersible powder systems, powder injection molding applications, or 3D printing applications. Moreover, these micropowders may be included as dry additives in oil and gas drilling formulations.

EXAMPLES

The following examples are provided to illustrate various embodiments, but are not intended to limit the scope of the claims. All parts and percentages are by weight unless otherwise indicated.

In the Examples, the following method is used to determine the total solids of the samples. A Sartorius MA150 moisture analyzer (Sartorius AG, Germany) is set to a starting temperature between 40° C. and 42° C. An aluminum pan is placed on the retainer under the hood of the moisture analyzer. Using tweezers, a fiberglass filter is placed, patterned side up, onto the aluminum pan. The scale is tared. Then, between 1.8 g and 2.2 g of sample at ambient temperature is placed on the filter. It is spread as rapidly, thinly, and evenly as possible over the filter. The hood is lowered and the moisture analyzer waits 2 seconds to calibrate the weight and begins to test the sample. The sample is heated to 110° C. over a period of 3 minutes using the standard drying program, and a temperature of 40° C. is set as the end and standby temperature. The moisture analyzer reports the dry weight, which is recorded as % total solids.

Example 1

A continuous aqueous solution phase is prepared using deionized water, polyvinyl alcohol, xanthan gum, surfactant, and an anti-foam agent. The composition is provided in Table 1 below. Specifically, polyvinyl alcohol is added as 4.77% SELVOL™ PVOH 203, a polyvinyl alcohol available from Sekisui Specialty Chemicals America, LLC (Dallas, Tex.), xanthan gum is added as 1% KELTROL®, a xanthan gum polysaccharide available from CP Kelco (Atlanta, GA), and TWEEN® 20, polyoxyethylenesorbitan monolaurate available from Croda International PLC (United Kingdom) is added as a surfactant.

TABLE 1

Table 1: Continuous Aqueous Solution Phase Composition

| Component | Function | Amount |
| --- | --- | --- |
| Deionized water | deionized water | 57.1 wt % |
| 4.77% SELVOL ™ PVOH 203 (polyvinyl alcohol) | stabilizing agent | 28.6 wt % |
| 1% KELTROL ® (xanthan gum polysaccharide) | rheology modifier | 14.3 wt % |
| TWEEN ® 20 | Surfactant | 0.011 wt % |

To form a dispersion, PLA in the form of a micronized powder is slowly added to the continuous phase solution detailed in Table 1 and mixed in a blender until a homogenous suspension is formed. Then, buffer is added to adjust the pH to 7.0. The composition is provided in Table 2 below.

TABLE 2

Table 2: PLA Dispersion Composition

| Component | Function | Amount |
| --- | --- | --- |
| Continuous Aqueous Phase | aqueous phase | 60.1 wt % |
| PLA 5 μm micronized powder | biodegradable polymer | 37.5 wt % |
| pH 7.0 Phosphate buffer (13.3% solids) | Buffer | 2.4 wt % |

Without being bound by theory, it is believed that the neutralization of the suspension with the buffer forms a PVOH/polysaccharide coacervate phase at the aqueous-solid interphase. It is further believed that the coacervate encapsulates the PLA particles, forming a shell or wall that may help reduce the rate at which catalytic hydrolysis occurs, as seen in aging studies at 50° C., as will be demonstrated in Example 2 below.

Hydrolytic stability is measured by measuring the loss of total solids. Without being bound by theory, it is believed that the loss of total solids is due to chain scission of the polymer as a result of hydrolysis. Samples are placed on a bench at ambient temperature (23° C.) and placed in an oven at 50° C. for a period of 29 days. The results are reported in Table 3 below.

TABLE 3

Table 3: Aging Data at Ambient (23° C.) and Elevated (50°) Temperatures

| Time (days) | % Total Solids | % Δ Total Solids |
| --- | --- | --- |
| Ambient Temperature (23° C.) | | |
| 0 | 38.0 | n/a |
| 29 | 38.6 | 1.6% |
| Elevated Temperature (50° C.) | | |
| 0 | 38.1 | n/a |
| 29 | 38.0 | −0.3% |

As shown in Table 3, there is not a significant change in the % total solids at either ambient temperature or at 50° C. Specifically, the change in the percentage of solids in the dispersion remains below about 10%. Without being bound by theory, a change in the percentage of solids in a dispersion of about 10% or greater may be generally accepted in the industry as a significant change in solids content.

Because the dispersion remains hydrolytically stable over a period of approximately 30 days, a longer study is conducted to determine if the dispersion remains hydrolytically stable over a longer period of time. Accordingly, three batches are prepared according to the recipe and methods provided above, and are placed on a bench at ambient temperature (23° C.) for a period of one year. The results are reported in Table 4 below.

TABLE 4

Table 4: Aging Data at Ambient (23° C.) Temperature

| Batch | Initial % Total Solids | % Total Solids at 1 year | % Δ Total Solids |
| --- | --- | --- | --- |
| A | 37.9 | 38.3 | 1.1% |
| B | 45.1 | 45.4 | 0.7% |
| C | 37.3 | 38.5 | 3.2% |

As shown in Table 4, there is not a significant change in the % total solids at ambient temperature over the one year period for the three batches. Specifically, the change in the percentage of solids in the dispersion remains below about 10%, and more particularly, below 3.5%.

Example 2

The order of addition of components may be altered to determine the effect on the forming of the PVOH/polysaccharide coacervate. Sample 1 is prepared as above, using the compositions provided in Tables 1 and 2. To form a dispersion, PLA in the form of a micronized powder is slowly added to the continuous phase solution detailed in Table 1 and mixed in a blender until a homogenous suspension is formed. Then, buffer is added to adjust the pH to 7.0.

To prepare Comparative Sample A, the continuous phase solution detailed in Table 1 is added to a blender and the phosphate buffer solution is added to the continuous phase solution and mixed. Then, PLA in the form of a micronized powder is slowly introduced into the buffered continuous phase solution and mixed well until a homogenous suspension is formed. The amounts of the components of Comparative Sample A are the same as the amounts reported in Table 2 above.

Without being bound by theory, it is believed that the neutralization of the continuous phase solution with the buffer forms a PVOH/polysaccharide coacervate phase at the aqueous-solid interphase. It is further believed that the coacervate particles are stabilized by the ionic strength of the buffering salts and precipitate out of solution. Therefore, it is believed that the addition of the buffer before the PLA particles are introduced to the system and the precipitation of the coacervate particles out of solution result in the PLA particles not being encapsulated, which, in turn, leads to a higher rate of hydrolysis.

Hydrolytic stability is measured by measuring the loss of total solids of Sample 1 and Comparative Sample A. Samples are placed on a bench at ambient temperature (23° C.) and placed in an oven at 50° C. for a period of 30 days. The results are reported in Table 5 below.

TABLE 5

Table 5: Aging Data at Ambient (23° C.) and Elevated (50°) Temperatures

| | Time (days) | % Total Solids | % Δ Total Solids |
|---|---|---|---|
| Ambient Temperature (23° C.) | | | |
| Sample 1 | 0 | 38.0 | n/a |
| | 30 | 38.6 | 1.6% |
| Comparative Sample A | 0 | 45.1 | n/a |
| | 30 | 46.1 | 2.2% |
| Elevated Temperature (50° C.) | | | |
| Sample 1 | 0 | 38.1 | n/a |
| | 30 | 38.0 | −0.3% |
| Comparative Sample A | 0 | 45.1 | n/a |
| | 30 | 38.1 | −15.5% |

Although the change in the amount of total solids of Comparative Sample A at ambient temperatures was similar to the change observed in Sample 1, the large decrease in the amount of total solids (a loss of 15.5% total solids) at 50° C. is indicative of higher rates of hydrolysis after thirty days. Accordingly, it is concluded that the addition of the buffer to the continuous phase solution does not protect the PLA particles from hydrolysis.

Example 3

Sample 2 is a PLA dispersion is made using PLA in the form of a PLA resin. Specifically, PVOH (SELVOL™ PVOH 203 from Sekisui Specialty Chemicals) and PLA resin are heated to a temperature above the melting point of the PLA resin and mixed in an extruder and co-extruded. Water is added to form a concentrated emulsion that includes 40 wt % PLA resin, 55 wt % water, and 5 wt % PVOH. Next, in a "post add process," a rheology modifier (xanthan gum polysaccharide available as KELTROL®) is added to the cooled emulsion, followed by a pH 7.00 phosphate buffer solution (7.15% buffer salts). It is customary but optional to add a few 0.001% to 0.2% of an antifoaming agent, and 0.1% to 0.3% biocides to a formulation. The final composition of the dispersion is provided in Table 6 below.

TABLE 6

Table 6: PLA Dispersion Composition

| Component | Function | Amount |
|---|---|---|
| Water | Dispersant | 63.9 wt % |
| PLA resin | biodegradable polymer | 33.2 wt % |
| 35% SELVOL ™ PVOH 203 (polyvinyl alcohol) | stabilizing agent | 1.7 wt % |
| 2.18% KELTROL ® (xanthan gum polysaccharide) | rheology modifier | 0.2 wt % |
| pH 7.0 Phosphate buffer (7.15% solids) | Buffer | 1.1 wt % |

Comparative Sample B was prepared by using PLA in the form of a PLA resin. Specifically, PVOH (SELVOL™ PVOH 203 from Sekisui Specialty Chemicals) and PLA resin are heated to a temperature above the melting point of the PLA resin and mixed in an extruder and co-extruded. Water is added to form a concentrated emulsion that includes 40 wt % PLA resin, 55 wt % water, and 5 wt % PVOH. Next, in a "post add process," a rheology modifier (xanthan gum polysaccharide available as KELTROL®) is added to the cooled emulsion. It is customary but optional to add a few 0.001% to 0.2% of an antifoaming agent, and 0.1% to 0.3% biocides to a formulation. The final composition of the dispersion of Comparative Sample B is provided in Table 7 below.

TABLE 7

Table 7: PLA Dispersion Composition

| Component | Function | Amount |
|---|---|---|
| water | Dispersant | 65.0 wt % |
| PLA resin | biodegradable polymer | 33.2 wt % |
| 4.77% SELVOL ™ PVOH 203 (polyvinyl alcohol) | stabilizing agent | 1.7 wt % |
| 2.18% KELTROL ® (xanthan gum polysaccharide) | rheology modifier | 0.2 wt % |

Hydrolytic stability is measured by measuring the loss of total solids of Sample 2 and Comparative Sample B. Samples are placed on a bench at ambient temperature (23° C.) and placed in an oven at 50° C. for a period of 30 days. The results are reported in Table 8 below.

TABLE 8

Table 8: Aging Data at Ambient (23° C.) and Elevated (50°) Temperatures

| | Time (days) | % Total Solids | % Δ Total Solids |
|---|---|---|---|
| Ambient Temperature (23° C.) | | | |
| Sample 2 | 0 | 35.8 | n/a |
| | 30 | 35.6 | −0.4% |
| Comparative Sample B | 0 | 41.2 | n/a |
| | 30 | 41.1 | −0.4% |
| Elevated Temperature (50° C.) | | | |
| Sample 2 | 0 | 35.8 | n/a |
| | 30 | 34.2 | −4.4% |
| Comparative Sample B | 0 | 41.9 | n/a |
| | 30 | 26.7 | −36.4% |

Although the change in the amount of total solids of Comparative Sample B at ambient temperatures was similar to the change observed in Sample 2, the large decrease in the amount of total solids (a loss of about 36% total solids) at 50° C. is indicative of higher rates of hydrolysis after thirty days. Accordingly, the dispersion of the PLA resin acts in a manner similar to the dispersion of the micronized PLA powder.

Example 4

Sample 3 is a PBS dispersion is made using PBS in the form of a PBS resin. Specifically, PVOH (SELVOL™ PVOH 203 from Sekisui Specialty Chemicals) and PBS resin are heated to a temperature above the melting point of the PBS resin and mixed in an extruder and co-extruded. Water is added to form a concentrated emulsion that includes 40 wt % PBS resin, 55 wt % water, and 5 wt % PVOH.

The PBS dispersion was diluted down to about 15% solids and an aging study was conducted. Hydrolytic stability is measured by measuring the loss of total solids of Sample 3. Samples are placed on a bench at ambient temperature (23° C.) and placed in an oven at 50° C. for a period of 30 days. The results are reported in Table 9 below.

TABLE 9

Table 9: Aging Data at Ambient (23° C.) and Elevated (50°) Temperatures

| | Time (days) | % Total Solids | % Δ Total Solids |
|---|---|---|---|
| Ambient Temperature (23° C.) | | | |
| Sample 3 | 0 | 15.0 | n/a |
| | 30 | 15.0 | 0.0% |
| Elevated Temperature (50° C.) | | | |
| Sample 3 | 0 | 15.0 | n/a |
| | 30 | 15.1 | 0.7% |

As shown in Table 9, there is not a significant change in the % total solids at either ambient temperature or at 50° C. over the thirty day period. Specifically, the change in the percentage of solids in the dispersion remains below about 10%, and more particularly, below 1%. Accordingly, the dispersion of the PBS resin acts in a manner similar to the dispersion of PLA in terms of hydrolytic stability.

Embodiments can be described with reference to the following numbered clauses, with preferred features laid out in dependent clauses:

1. An aqueous-based dispersion of a hydrolytically unstable polymer which is substantially free of volatile organic compounds, comprising particles of said hydrolytically unstable polymer and a stabilizing agent in water.

2. The aqueous-based dispersion of clause 1, wherein the hydrolytically unstable polymer comprises a biodegradable polymer.

3. The aqueous-based dispersion of clause 1 or clause 2, wherein the biodegradable polymer comprises a polyester.

4. The aqueous-based dispersion of clause 3, wherein the polyester comprises a polymer selected from the group consisting of polylactic acid (PLA), polymalate (PMA), polyhydroxyalkanoate (PHA), polyhydroxybutyrate (PHB), polycaprolactone (PCL), polyesteramide (PEA), polyhydroxyvalerate (PHV), polyhydroxyhexanoate (PHH), aliphatic copolyesters (PBSA), polyethylene furanoate (PEF), polybutylene succinate (PBS), poly(poly sebate) (PPS), and polyglycolic acid.

5. The aqueous-based dispersion of clause 3 or clause 4, wherein the polyester comprises polylactic acid (PLA).

6. The aqueous-based dispersion of any preceding clause, wherein the hydrolytically unstable polymer is present in an amount of from about 5 wt % to about 95 wt % based on a total weight of the aqueous-based dispersion.

7. The aqueous-based dispersion of any preceding clause, wherein the hydrolytically unstable polymer is present in an amount of from about 50 wt % to about 90 wt % based on a total weight of the aqueous-based dispersion.

8. The aqueous-based dispersion of any preceding clause, wherein the stabilizing agent is selected from the group consisting of polyvinyl alcohol, polyethylene glycols, cellulosic polysaccharides, biopolymer polysaccharides, synthetic hydrocarbon polymers, saponified fatty acids, acrylic copolymers, polyacrylate ammonium salts, polyether carboxylate polymers, and base-neutralized ethylene acrylic acid copolymers.

9. The aqueous-based dispersion of any preceding clause, wherein the stabilizing agent comprises polyvinyl alcohol.

10. The aqueous-based dispersion of any preceding clause, wherein said hydrolytically unstable polymer comprises polylactic acid and said stabilizing agent comprises polyvinyl alcohol.

11. The aqueous-based dispersion of any preceding clause, wherein the stabilizing agent is present in an amount of from about 0.1 wt % to about 25 wt % based on a total weight of the aqueous-based dispersion.

12. The aqueous-based dispersion of any preceding clause, wherein the stabilizing agent is present in an amount of from about 0.5 wt % to about 15 wt % based on a total weight of the aqueous-based dispersion.

13. The aqueous-based dispersion of any preceding clause, wherein the dispersion further comprises a rheology modifier.

14. The aqueous-based dispersion of clause 13, wherein the rheology modifier is selected from the group consisting of inorganic clays, cellulosic polysaccharides, synthetic hydrocarbon polymers, polyolefinic sulfonate and copolymers thereof, polyvinylpyrrolidone, copolymers of polystyrene and maleic anhydride, copolymers of polymethylene ether and maleic anhydride, biopolymer polysaccharides, acrylic copolymers, polyacrylate ammonium salts, polyether carboxylate polymers, and base-neutralized ethylene acrylic acid copolymers.

15. The aqueous-based dispersion of clause 13 or clause 14, wherein the rheology modifier is present in an amount from about 0.01 wt % to about 5 wt % based on a total weight of the aqueous-based dispersion.

16. The aqueous-based dispersion of any of clauses 13-15, wherein the rheology modifier is present in an amount from about 0.1 wt % to about 3 wt % based on a total weight of the aqueous-based dispersion.

17. The aqueous-based dispersion of any of clauses 13-16, wherein the rheology modifier comprises a biopolymer polysaccharide.

18. The aqueous-based dispersion of any of clause 17, wherein the biopolymer polysaccharaide comprises xanthan gum.

19. The aqueous-based dispersion of any preceding clause, wherein the particles of the hydrolytically unstable polymer have an average diameter of from about 25 nm to about 600 μm.

20. The aqueous-based dispersion of any preceding clause, further comprising a pH buffering agent.

21. The aqueous-based dispersion of clause 20, wherein said pH buffering agent is selected from the group consisting of salts of weak acids and bases.

22. The aqueous-based dispersion of clause 20 or clause 21, wherein said pH buffering agent is present in an amount of from about 0.01 wt % to about 1 wt % based on a total weight of the aqueous-based dispersion.

23. A process for making a hydrolytically stable aqueous-based dispersion of a hydrolytically unstable polymer comprising emulsifying the hydrolytically unstable polymer at a temperature of from between about 25° C. to about 170° C. by blending together the hydrolytically unstable polymer, water, and a stabilizing agent to form the hydrolytically stable aqueous-based dispersion of the hydrolytically unstable polymer.

24. The process of clause 23, further comprising heating the hydrolytically unstable polymer to a temperature above its melting point before blending with water and the stabilizing agent.

25. The process of clause 23 or clause 24, wherein the hydrolytically unstable polymer is provided as a micronized powder.

26. The process of any of clauses 23-25, further comprising blending a rheology modifier into said hydrolytically stable aqueous-based dispersion.

27. The process of clause 26, wherein the rheology modifier is selected from the group consisting of inorganic clays, cellulosic polysaccharides, synthetic hydrocarbon polymers, polyolefinic sulfonate and copolymers thereof, polyvinylpyrrolidone, copolymers of polystyrene and maleic anhydride, copolymers of polymethylene ether and maleic anhydride, biopolymer polysaccharides, acrylic copolymers, polyacrylate ammonium salts, polyether carboxylate polymers, and base-neutralized ethylene acrylic acid copolymers.

28. The process of clause 26 or clause 27, wherein the rheology modifier is present in an amount from about 0.01 wt % to about 5 wt % based on a total weight of the aqueous-based dispersion.

29. The process of any of clauses 26-28, wherein the rheology modifier is present in an amount from about 0.1 wt % to about 3 wt % based on a total weight of the aqueous-based dispersion.

30. The process of any of clauses 26-29, wherein the rheology modifier comprises a biopolymer polysaccharide.

31. The process of clause 30, wherein the biopolymer polysaccharaide comprises xanthan gum.

32. The process of any of clauses 23-31, further comprising blending a pH buffering agent into said hydrolytically stable aqueous-based dispersion.

33. The process of clause 32, wherein said pH buffering agent is selected from the group consisting of salts of weak acids and bases having a $pK_a$ of between about 6 and about 8.

34. The process of any of clauses 23-33, wherein particles of the hydrolytically unstable polymer in the hydrolytically stable aqueous-based dispersion have an average diameter of from about 25 nm to about 600 μm.

35. The process of any of clauses 23-34, wherein the hydrolytically unstable polymer comprises a biodegradable polymer.

36. The process of clause 35, wherein the biodegradable polymer comprises a polyester.

37. The process of clause 36, wherein the polyester comprises a polymer selected from the group consisting of polylactic acid (PLA), polymalate (PMA), polyhydroxyalkanoate (PHA), polyhydroxybutyrate (PHB), polycaprolactone (PCL), polyesteramide (PEA), polyhydroxyvalerate (PHV), polyhydroxyhexanoate (PHH), aliphatic copolyesters (PBSA), polyethylene furanoate (PEF), polybutylene succinate (PBS), poly(poly sebate) (PPS), and polyglycolic acid.

38. The process of clause 36 or clause 37, wherein the polyester comprises polylactic acid (PLA).

39. The process of any of clauses 23-38, wherein the hydrolytically unstable polymer is present in an amount of from about 5 wt % to about 95 wt % based on a total weight of the aqueous-based dispersion.

40. The process of any of clauses 23-39, wherein the hydrolytically unstable polymer is present in an amount of from about 50 wt % to about 90 wt % based on a total weight of the aqueous-based dispersion.

41. The process of any of clauses 23-40, wherein the stabilizing agent is selected from the group consisting of polyvinyl alcohol, polyethylene glycols, cellulosic polysaccharides, biopolymer polysaccharides, synthetic hydrocarbon polymers, saponified fatty acids, acrylic copolymers, polyacrylate ammonium salts, polyether carboxylate polymers, and base-neutralized ethylene acrylic acid copolymers.

42. The process of any of clauses 23-41, wherein the stabilizing agent comprises polyvinyl alcohol.

43. The process of any of clauses 23-42, wherein said hydrolytically unstable polymer comprises polylactic acid and said stabilizing agent comprises polyvinyl alcohol.

44. The process of any of clauses 23-43, wherein the stabilizing agent is present in an amount of from about 0.1 wt % to about 25 wt % based on a total weight of the aqueous-based dispersion.

45. The process of any of clauses 23-44, wherein the stabilizing agent is present in an amount of from about 0.5 wt % to about 15 wt % based on a total weight of the aqueous-based dispersion.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For the purposes of describing and defining the present invention it is noted that the term "substantially" is utilized herein to represent the inherent degree of uncertainty that may be attributed to any quantitative comparison, value, measurement, or other representation. Unless the meaning is clearly to the contrary, all ranges set forth herein are deemed to be inclusive of all values within the recited range as well as the endpoints.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An aqueous-based dispersion of a hydrolytically unstable polymer which is substantially free of volatile organic compounds, consisting of biodegradable polymer particles, stabilizing agent, and optionally one or more components selected from the group consisting of viscosity increasing rheology modifiers and pH buffering agents in water, wherein the stabilizing agent consists of polyvinyl alcohol, and wherein the biodegradable polymer particles consist of biodegradable polymer.

2. The aqueous-based dispersion of claim 1, wherein the biodegradable polymer is a polyester.

3. The aqueous-based dispersion of claim 2, wherein the polyester is a polymer selected from the group consisting of polylactic acid (PLA), polymalate (PMA), polyhydroxyalkanoate (PHA), polyhydroxybutyrate (PHB), polycaprolactone (PCL), polyesteramide (PEA), polyhydroxyvalerate (PHV), polyhydroxyhexanoate (PHH), aliphatic copolyesters (PBSA), polyethylene furanoate (PEF), polybutylene succinate (PBS), poly(poly sebate) (PPS), polyglycolic acid, and blends thereof.

4. The aqueous-based dispersion of claim 2, wherein the polyester is polylactic acid (PLA).

5. The aqueous-based dispersion of claim 1, wherein the biodegradable polymer is present in an amount of from about 5 wt % to about 95 wt % based on a total weight of the aqueous-based dispersion.

6. The aqueous-based dispersion of claim 1, wherein the stabilizing agent is present in an amount of from about 0.1 wt % to about 25 wt % based on a total weight of the aqueous-based dispersion.

7. The aqueous-based dispersion of claim 1, wherein the stabilizing agent is present in an amount of from about 0.5 wt % to about 15 wt % based on a total weight of the aqueous-based dispersion.

8. The aqueous-based dispersion of claim 1, wherein the rheology modifier is selected from the group consisting of inorganic clays, and polysaccharides.

9. The aqueous-based dispersion of claim 1, wherein the rheology modifier is present in an amount from about 0.01 wt % to about 5 wt % based on a total weight of the aqueous-based dispersion.

10. The aqueous-based dispersion of claim 1, wherein the rheology modifier is present in an amount from about 0.1 wt % to about 3 wt % based on a total weight of the aqueous-based dispersion.

11. The aqueous-based dispersion of claim 1, wherein the rheology modifier comprises polysaccharide.

12. The aqueous-based dispersion of claim 11, wherein the polysaccharide comprises xanthan gum.

13. The aqueous-based dispersion of claim 1, wherein the biodegradable polymer particles have an average diameter of from about 25 nm to about 600 μm.

14. The aqueous-based dispersion of claim 1, wherein said pH buffering agent is selected from the group consisting of salts of weak acids and bases.

15. The aqueous-based dispersion of claim 1, wherein said pH buffering agent is present in an amount of from about 0.01 wt % to about 1 wt % based on a total weight of the aqueous-based dispersion.

* * * * *